July 31, 1934.  H. JAFFE  1,968,522
AUTOMOBILE HEATER AND MOTOR COOLER
Filed March 6, 1933
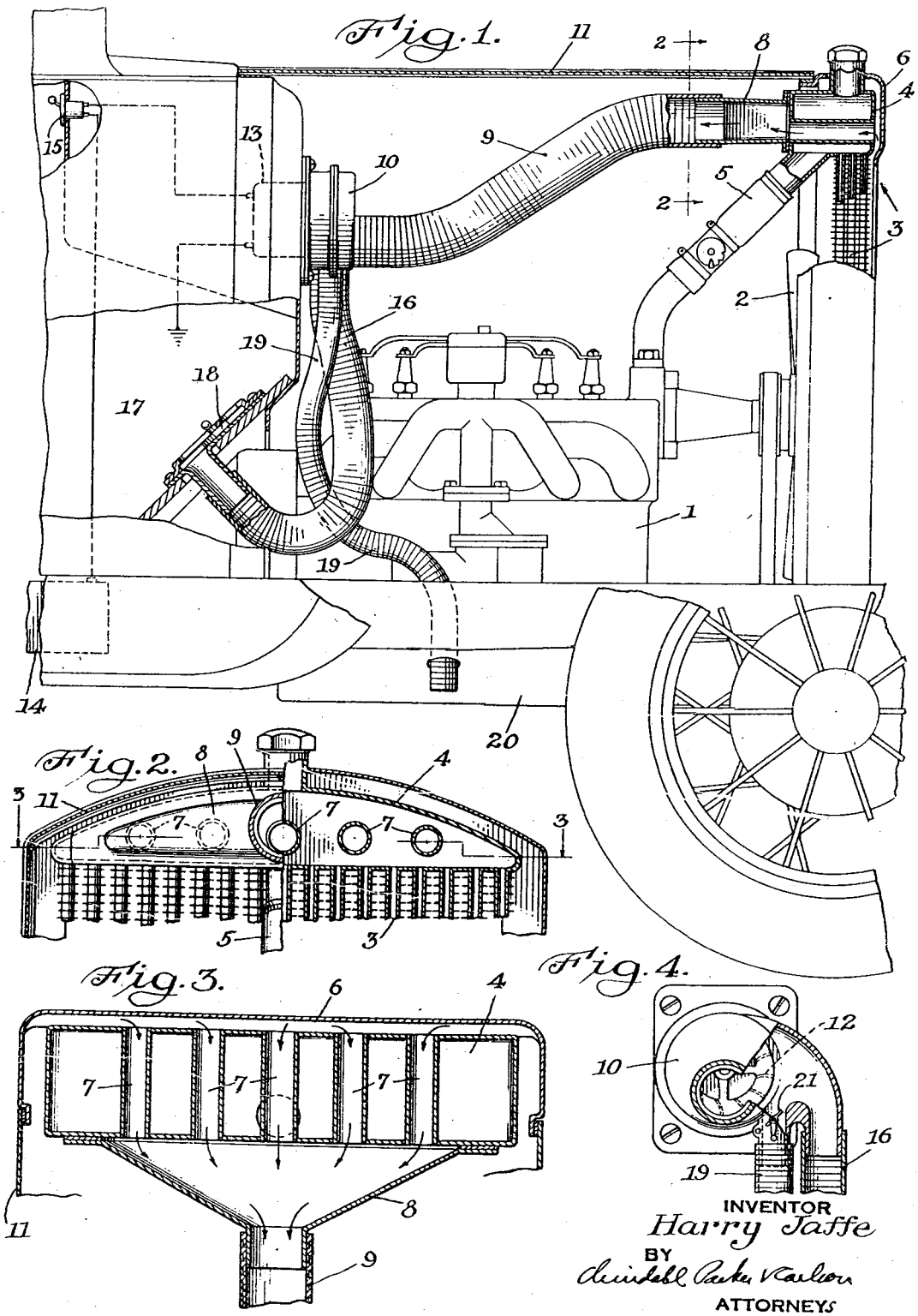
INVENTOR
*Harry Jaffe*
BY
ATTORNEYS Patented July 31, 1934

1,968,522

UNITED STATES PATENT OFFICE 1,968,522

AUTOMOBILE HEATER AND MOTOR COOLER

Harry Jaffe, Chicago, Ill., assignor to Sears, Roebuck and Co., Chicago, Ill., a corporation of New York Application March 6, 1933, Serial No. 659,774

1 Claim. (Cl. 257—241)

This invention relates to automobile heaters of the type in which warm air is supplied to the interior of the car body.

It has been heretofore proposed to obtain the supply of air by drawing it through the core of the automobile radiator, but this necessitates the use of plates and other mechanical parts which cover a portion of the core and thus reduce its efficiency in cooling the engine. Moreover, the portion of the water flowing through the core is cooler than that in the top tank above the core and therefore its efficiency in heating the air to be used for warming the interior of the car body has been reduced.

I obviate the two difficulties above alluded to by drawing the air through the top tank where it is heated by the hot water and hot water vapor that fill the tank.

In the prior constructions wherein air is drawn through the core, rain, snow and sleet also enter during stormy weather. With my arrangement, no such extraneous matter can enter the car-heating system, as the air intake or intakes are in the top tank behind the front shell.

It has also been proposed to take the air in through a funnel located on or near the motor and spaced rearwardly of the radiator, but with such an arrangement there is danger that oil fumes and other deleterious vapors and gases will enter with the air and thus be introduced into the car body. I avoid this danger by drawing the air through intake openings in the top tank, whereby a supply of fresh air is assured.

In the prior art it has been proposed to utilize the ordinary engine fan for forcing air into the car body, but it is apparent that with such an arrangement air can be forced into the car body only while the engine is running. My invention contemplates the use of a special fan driven by an electric motor which derives its power from a suitable source, such as the automobile battery, thus permitting the fan to be operated and the car body to be ventilated and warmed during intervals in which the engine is not operated.

The use of a special fan and motor is further advantageous in that the fan may be operated to cool the jacket water during hot weather or at other times when there is danger that the engine shall become overheated. In order that the special fan may be so used at times when there is no need for heating the interior of the car body, I provide a special vent through which the hot air may be discharged to a point outside the car.

In the accompanying drawing,

Figure 1 is a fragmental right-hand side elevation of an automobile equipped with apparatus embodying the features of my invention.

Fig. 2 is a section on line 2—2 of Fig. 1.

Fig. 3 is a section on line 3—3 of Fig. 2.

Fig. 4 is a fragmental view showing a valve for directing the air to the car body or to the vent above referred to.

In the drawing, 1 is the automobile engine, 2 is the fan driven thereby, 3 is the core of the radiator, 4 is the top tank of the radiator, 5 is the tube through which hot water flows from the jacket of the engine to the top tank, and 6 is the usual radiator shell.

Any desired number of air tubes 7 extend horizontally through the top tank 4, the front ends of the tubes being arranged to take in air from in front of the radiator and behind the shell 6. The rear ends of the tubes 7 communicate with a funnel 8 which in turn is connected to a tube 9 that extends to the intake of a fan casing 10. The funnel 8 and the tube 9 constitute means to conduct air from the tubes 7 to the fan intake 10. The fan casing may be supported in any preferred manner and in any desired place, as, for example, under the hood 11 of the car. Within the fan casing 10 is a fan or impeller 12 (Fig. 4) that is arranged to be driven by means of a direct-connected electric motor 13. The motor is herein shown as deriving current from the usual automobile storage battery 14, 15 being a switch for starting and stopping the motor, but it will be understood that the motor may be energized from any other suitable source which is independent of the engine.

Connected to the discharge of the fan casing 10 is a tube 16 that extends to any preferred point within the car body, as, for example, to the forward compartment 17, where a damper 18 is provided to regulate or shut off the supply of warm air. A tube 19 also is connected to the discharge fan casing 10 and extends to a point outside the car body, as, for example, to a point below the drip pan 20 (Fig. 1).

Any preferred means may be used to direct the discharge from the fan casing 10 to the tube 16 or the tube 19. Herein I have shown a butterfly valve 21 which may be arranged for operation by the driver through a connection not herein shown. Thus by closing the damper 18 and opening the valve 21, the discharge from the fan casing will be directed through the tube 19.

It will be evident that the arrangement herein illustrated and described subjects the air to the heating action of the radiator in the most effective region, that is to say, in the top tank. It will also be noted that I have avoided any obstruction to the flow of air through the radiator core, thus avoiding any reduction in the efficiency of the radiator in cooling the jacket water. On the contrary, the provision of the air tubes 7 in the top tank increases the efficiency of the radiator in cooling the jacket water. Moreover, since air is drawn through the top tank by means of a special fan, which may discharge the heated air through the tube 19 to a point outside the car body, it will be apparent that said fan may be used to reduce the danger of overheating the motor during hot weather, hill climbing and at other times when the radiator without such assistance would be inadequate to prevent overheating of the engine.

I claim as my invention:

In a motor vehicle, the combination of a radiator comprising a top tank and a core, a shell in front of the top tank, an air tube extending through the top tank, the inlet end of the tube being behind the shell, a fan for drawing air through said tube and means to conduct air from the outlet and of said air tube to the fan.

HARRY JAFFE.

also be noted that I have avoided any obstruction to the flow of air through the radiator core, thus avoiding any reduction in the efficiency of the radiator in cooling the jacket water. On the contrary, the provision of the air tubes 7 in the top tank increases the efficiency of the radiator in cooling the jacket water. Moreover, since air is drawn through the top tank by means of a special fan, which may discharge the heated air through the tube 19 to a point outside the car body, it will be apparent that said fan may be used to reduce the danger of overheating the motor during hot weather, hill climbing and at other times when the radiator without such assistance would be inadequate to prevent overheating of the engine.

I claim as my invention:

In a motor vehicle, the combination of a radiator comprising a top tank and a core, a shell in front of the top tank, an air tube extending through the top tank, the inlet end of the tube being behind the shell, a fan for drawing air through said tube and means to conduct air from the outlet and of said air tube to the fan.

HARRY JAFFE.

CERTIFICATE OF CORRECTION.

Patent No. 1,968,522. July 31, 1934.

HARRY JAFFE.

It is hereby certified that error appears in the printed specification of the above numbered patent requiring correction as follows: Page 2, last line of the claim, for "and" read end; and that the said Letters Patent should be read with this correction therein that the same may conform to the record of the case in the Patent Office.

Signed and sealed this 25th day of September, A. D. 1934.

Leslie Frazer (Seal)

Acting Commissioner of Patents.